United States Patent
Nogami

(10) Patent No.: US 12,506,202 B2
(45) Date of Patent: Dec. 23, 2025

(54) SEALED BATTERY

(71) Applicant: SANYO Electric Co., Ltd., Kadoma (JP)

(72) Inventor: Takahiro Nogami, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 607 days.

(21) Appl. No.: 17/779,338

(22) PCT Filed: Nov. 19, 2020

(86) PCT No.: PCT/JP2020/043102
§ 371 (c)(1),
(2) Date: May 24, 2022

(87) PCT Pub. No.: WO2021/106728
PCT Pub. Date: Jun. 3, 2021

(65) Prior Publication Data
US 2022/0407157 A1    Dec. 22, 2022

(30) Foreign Application Priority Data
Nov. 29, 2019 (JP) .................................. 2019-217031

(51) Int. Cl.
*H01M 50/186* (2021.01)
*H01M 50/107* (2021.01)
(Continued)

(52) U.S. Cl.
CPC ....... *H01M 50/186* (2021.01); *H01M 50/107* (2021.01); *H01M 50/317* (2021.01); *H01M 50/578* (2021.01)

(58) Field of Classification Search
CPC . H01M 50/186; H01M 50/107; H01M 50/578
See application file for complete search history.

(56) References Cited

U.S. PATENT DOCUMENTS

| 5,567,539 A | 10/1996 | Takahashi et al. |
| 5,609,972 A | 3/1997 | Kaschmitter et al. |
| 2011/0086251 A1* | 4/2011 | Kim .................... H01M 50/171 |
| | | 429/53 |

FOREIGN PATENT DOCUMENTS

| JP | 6-196140 A | 7/1994 |
| JP | H07-320711 A | 12/1995 |
| | (Continued) | |

OTHER PUBLICATIONS

International Search Report dated Feb. 16, 2021, issued in counterpart International Application No. PCT/JP2020/043102, with English Translation. (4 pages).

(Continued)

*Primary Examiner* — Sadie White
*Assistant Examiner* — Kayla Elaine Clary
(74) *Attorney, Agent, or Firm* — WHDA, LLP

(57) ABSTRACT

The sealed battery according to the present disclosure is provided with: an electrode body including a negative electrode and a positive electrode having a positive electrode tab; a bottomed cylindrical exterior body for housing the electrode body; and a sealing body for sealing the opening portion of the exterior body via a gasket. The sealing body includes a metal valve body. The valve body has a peripheral edge portion and a reverse portion more protruding to the electrode body side than the peripheral edge portion. The positive electrode tab is led out from the electrode body, is connected to the reverse portion, and has a non-linear portion in a range surrounded by the electrode body and the reverse portion. The non-linear portion has a recess portion and a protrusion portion facing each other at both ends along the led-out direction of the positive electrode tab in a plan view.

5 Claims, 3 Drawing Sheets

(51) Int. Cl.
*H01M 50/317* (2021.01)
*H01M 50/578* (2021.01)

(56) References Cited

FOREIGN PATENT DOCUMENTS

| | | |
|---|---|---|
| JP | 2000-003700 A | 1/2000 |
| JP | 2000-512062 A | 9/2000 |
| JP | 2015-69946 A | 4/2015 |
| WO | 2019/120236 A1 | 6/2019 |

OTHER PUBLICATIONS

Extended (Supplementary)European Search Report dated Jun. 20, 2023, issued in counterpart EP Application No. 20891553.8. (9 pages).
Office Action dated Sep. 17, 2024, issued in counterpart JP application No. 2021-561352, with English translation. (9 pages).

\* cited by examiner

Figure 2
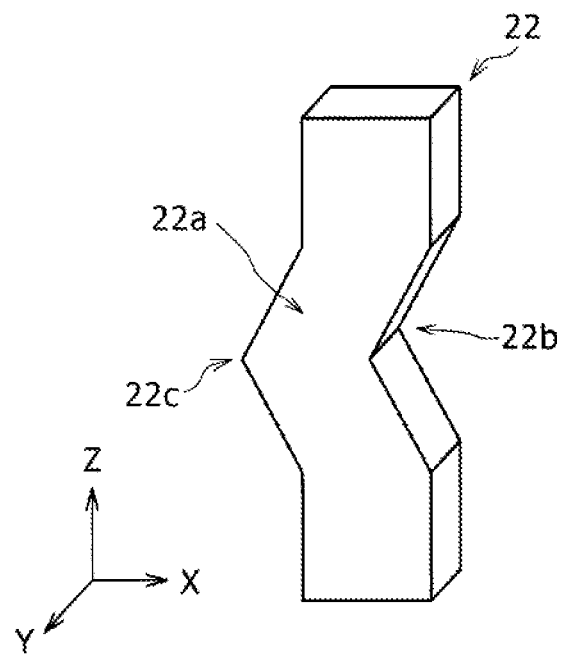
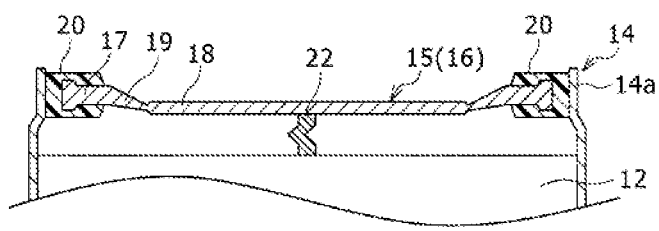
Figure 3 (A)
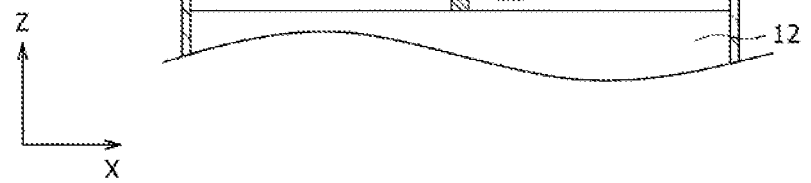
Figure 3 (B)

SEALED BATTERY

CROSS-REFERENCE TO RELATED APPLICATIONS

This application is a national stage of International Application No. PCT/JP2020/043102, filed Nov. 19, 2020, which claims priority to Japanese Patent Application No. 2019-217031 filed Nov. 29, 2019 both of which are hereby incorporated by reference in their entirety.

TECHNICAL FIELD

The present invention relates to a sealed battery.

BACKGROUND ART

In recent years, applications of a secondary battery have expanded into, for example, power supplies for electric vehicles and storage battery devices for utilizing natural energy, and the secondary battery is required for increasing capacity and output. Meanwhile, with higher capacity and higher output, the secondary battery is required to have higher safety.

Conventionally used is a secondary battery provided with a current interrupt device that interrupts a current path in the battery in the case where the internal pressure increases due to overcharge or the like and thereby prevents thermal runaway and a burst. Patent Literature 1 and Patent Literature 2 disclose a current interrupt device that interrupts a current path between a metallic vent member and an electrode assembly, in which an easily breakable part having a small cross-sectional area is provided by forming a notch or the like in a part of a tab for connecting the vent member included in a sealing assembly and the electrode assembly such that the tab breaks at the easily breakable part in accordance with the deformation of the vent member in the case where the internal pressure of the battery increases.

CITATION LIST

Patent Literature

PATENT LITERATURE 1: Japanese Unexamined Patent Application Publication No. Hei 6-196140
PATENT LITERATURE 2: National Publication of International Patent Application No. 2000-512062

SUMMARY

Technical Problem

However, in the current interrupt device disclosed in Patent Literature 1 and Patent Literature 2, a tab has an easily breakable part having a small cross-sectional area, which causes an increase in resistance of the secondary battery and prevents higher output of the secondary battery.

An object of the present disclosure is to provide a sealed battery with improved safety while suppressing an increase in battery resistance.

Solution to Problem

The sealed battery of an aspect of the present disclosure comprises an electrode assembly including a positive electrode having a positive electrode tab and a negative electrode, a bottomed cylindrical metallic exterior housing body that houses the electrode assembly, and a sealing assembly that seals an opening of the exterior housing body with a gasket interposed between the exterior housing body and the sealing assembly. The sealing assembly includes a metallic vent member. The vent member has a circumferential part and an inversion part projecting from the circumferential part toward the electrode assembly side. The positive electrode tab is led out from the electrode assembly to be connected to the inversion part and has a non-linear portion in an area surrounded by the electrode assembly and the inversion part. The non-linear portion has a recess and a projection that face each other, at both ends along a lead-out direction of the positive electrode tab on a plan view.

Advantageous Effects of Invention

The sealed battery of an aspect of the present disclosure can improve the safety while suppressing an increase in battery resistance.

BRIEF DESCRIPTION OF DRAWING

FIG. 2 is a perspective view of a positive electrode tab in the secondary battery illustrated in FIG. 1.
FIGS. 3 (A) and 3(B) are an enlarged view of the vicinity of a sealing assembly in a secondary battery of an example of an embodiment, in which
FIG. 3(A) is a diagram illustrating a normal state and FIG. 3(B) is a diagram illustrating a state after a current interrupt device is operated.
FIGS. 4 (A) and 4(B) are a diagram illustrating a method of manufacturing a secondary battery of an example of an embodiment, in which
FIG. 4(A) is a diagram illustrating a step of connecting a positive electrode tab to a vent member,
and FIG. 4(B) is a diagram illustrating a step of caulking an exterior housing body to a sealing assembly.

DESCRIPTION OF EMBODIMENTS

Hereinafter, a cylindrical non-aqueous electrolyte secondary battery (hereinafter, referred to as a secondary battery) of an example of an embodiment of the sealed battery according to the present disclosure will be described with reference to the drawings. In the following description, specific shapes, materials, values, directions, and the like, which are examples for facilitating understanding of the present invention, may be appropriately modified with specifications of cylindrical secondary batteries. The exterior housing body is not limited to being in cylindrical form and may be in rectangular form or the like. When a plurality of embodiments and modified examples are included in the following description, use in appropriate combination of characteristic portions thereof are anticipated in advance.

Figure 1:
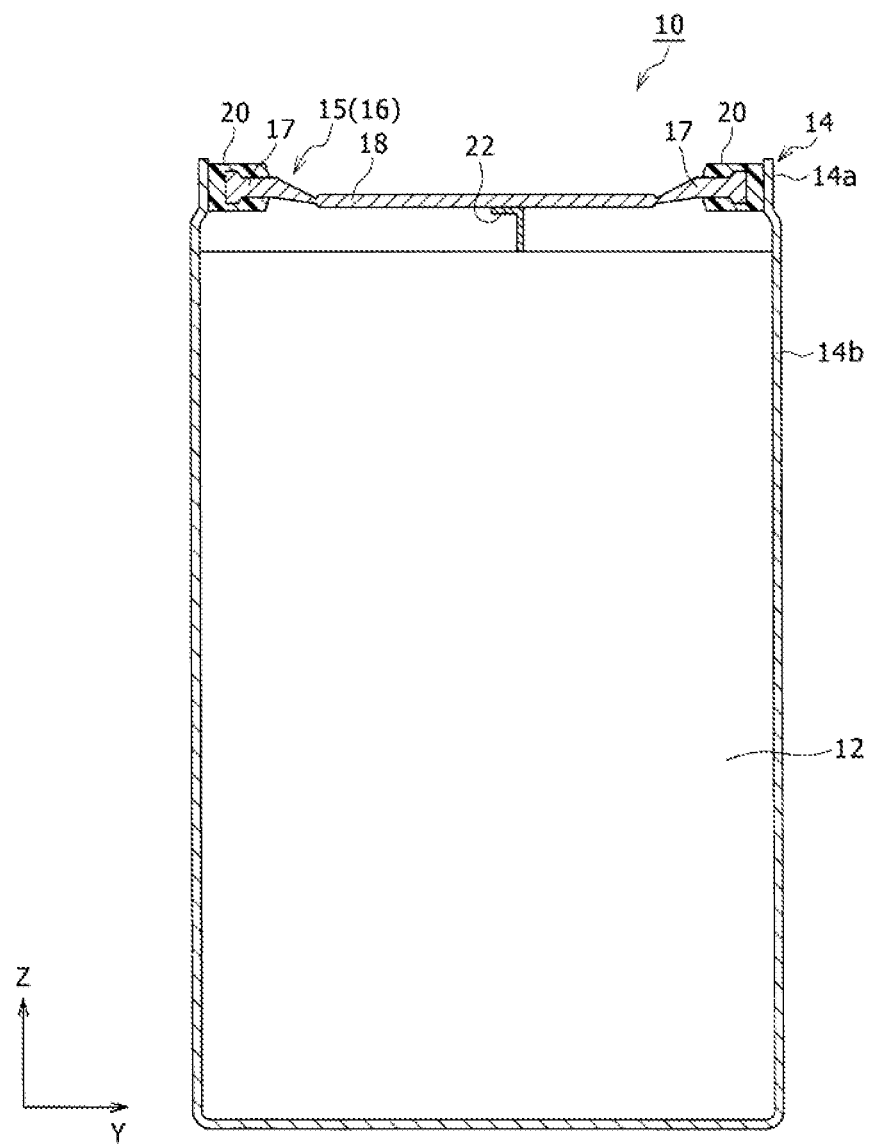
FIG. 1 is a longitudinal sectional view of a cylindrical secondary battery of an example of an embodiment.

FIG. 1 is a longitudinal sectional view of a secondary battery 10 of an example of an embodiment. In the secondary battery 10 illustrated in FIG. 1, an electrode assembly 12 and a non-aqueous electrolyte (not illustrated) are housed in an exterior housing body 14. Hereinafter, for convenience of description, the sealing assembly 15 side will be described as "the upper side", and the bottom side of the exterior housing body 14 will be described as "the lower side". The up-down direction may be referred to as the vertical direction, and a radial direction of the exterior housing body 14 may be referred to as the horizontal direction.

For a non-aqueous solvent of the non-aqueous electrolyte (organic solvent), carbonates, lactones, ethers, ketones, esters, and the like may be used, and two or more of these solvents may be mixed to be used. When two or more of the solvent are mixed to be used, a mixed solvent including a cyclic carbonate and a chain carbonate is preferably used. For example, ethylene carbonate (EC), propylene carbonate (PC), butylene carbonate (BC), and the like may be used as the cyclic carbonate, and dimethyl carbonate (DMC), ethyl methyl carbonate (EMC), diethyl carbonate (DEC), and the like may be used as the chain carbonate. For an electrolyte salt in the non-aqueous electrolyte, $LiPF_6$, $LiBF_4$, $LiCF_3SO_3$, and the like, and a mixture thereof may be used. An amount of the electrolyte salt dissolved in the non-aqueous solvent may be, for example, 0.5 to 2.0 mol/L.

The electrode assembly 12 has a wound structure in which a positive electrode and a negative electrode are wound with a separator interposed therebetween. The electrode assembly 12 includes a positive electrode, a negative separator, and a separator. The positive electrode has a band-shaped positive electrode current collector and a positive electrode mixture layer formed on both surfaces of the positive electrode current collector. For the positive electrode current collector, a foil of a metal, such as aluminum, a film in which such a metal is disposed on a surface layer thereof, and the like are used, for example. A thickness of the positive electrode current collector is, for example, 10 μm to 30 μm.

For example, the positive electrode mixture layer is produced by: applying a positive electrode mixture slurry including the positive electrode active material, the conductive agent, the binder, and a solvent such as N-methyl-2-pyrrolidone (NMP) on both surfaces of the positive electrode current collector; and then drying and compressing the positive electrode mixture layer. Examples of the positive electrode active material may include a lithium-containing transition metal oxide containing a transition metal element such as Co, Mn, and Ni. Examples of the conductive agent include carbon materials such as carbon black (CB), acetylene black (AB), Ketjenblack, and graphite. Examples of the binder include fluororesins such as polytetrafluoroethylene (PTFE) and polyvinylidene fluoride (PVdF), polyacrylonitrile (PAN), a polyimide (PI), an acrylic resin, and a polyolefin resin.

As illustrated in FIG. 1, the positive electrode tab 22 connected to the positive electrode is led out upward from the vicinity of a winding axis of the electrode assembly 12. A position at which the positive electrode tab 22 is led out from the electrode assembly 12 is not particularly limited as long as the positive electrode tab 22 breaks in the case where the pressure in the battery increases, and for example, the position preferably faces an inversion part 18, described later. Thus, the positive electrode tab 22 can be easily connected to the inversion part 18. For the positive electrode tab 22, a rectangular metal plate is preferably used, and one end of the metal plate is connected to the positive electrode current collector with welding or the like. An exposed part of the positive electrode current collector to be connected to the positive electrode tab 22 is provided by, for example, intermittent application in which the positive electrode mixture slurry is not applied on a winding initial end part in a longitudinal direction of the positive electrode current collector, such that one end of the positive electrode tab 22 can be connected to the exposed part. A part of the positive electrode current collector extends to be led out from the electrode assembly 12, and the extension part may be used as the positive electrode tab 22 instead of the metal plate.

The negative electrode has a band-shaped negative electrode current collector and a negative electrode mixture layer formed on both surfaces of the negative electrode current collector. For the negative electrode current collector, a foil of a metal such as copper, a film in which such a metal is disposed on a surface layer thereof, or the like is used, for example. A thickness of the negative electrode current collector is, for example, 5 μm to 30 μm.

For example, the negative electrode mixture layer is produced by: applying a negative electrode mixture slurry including the negative electrode active material, the binder, water, and the like on both surfaces of the negative electrode current collector; and drying and compressing the negative electrode mixture layer. Examples of the negative electrode active material may include carbon materials such as natural graphite and artificial graphite, metals that form an alloy with lithium such as Si and Sn, or an alloy or oxide including them. Examples of the binder include styrene-butadiene rubber (SBR), CMC or a salt thereof, polyacrylic acid or a salt thereof, polyvinyl alcohol, and the like.

For the separator, a porous sheet having an ion permeation property and an insulation property is used. Specific examples of the porous sheet include a fine porous thin film, a woven fabric, and a nonwoven fabric. As a material of the separator, an olefin resin such as polyethylene and polypropylene is preferable. A thickness of the separator is, for example, 10 μm to 50 μm. With higher capacity and higher output of the battery, the separator has tended to be thinned. The separator has a melting point of, for example, approximately 130° C. to 180° C.

Next, the exterior housing body 14 and the sealed part 15 will be described with reference to FIG. 1. The exterior housing body 11 is a bottomed cylindrical metallic container, and an outer diameter of an opening 14a at an upper end is smaller than an outer diameter of a body part 14b. In the body part 14b, the electrode assembly 12 is housed. Since the negative electrode current collector is exposed on the outermost circumference surface of the electrode assembly 12, and contacts the exterior housing body 14, the exterior housing body 14 becomes a negative electrode terminal of the secondary battery 10. An exposed part of the negative electrode current collector to be connected to the exterior housing body 14 can be provided by, for example, intermittent application in which the negative electrode mixture slurry is not applied on a winding terminal end part in a longitudinal direction of the negative electrode current collector.

In the present embodiment, the sealed assembly 15 is formed by the metallic vent member 16. The sealed assembly 15 may include the other members such as a terminal cap arranged on an upper surface of the vent member 16, for example. In the vent member 16, the inversion part 18 on the inner peripheral side of the circumferential part 17 projects toward the electrode assembly 12 side from the circumferential part 17 in a normal state, as illustrated in FIG. 1. The inversion part 18 and the positive electrode are connected via the positive electrode tab 22, and the sealed assembly 15 becomes a positive electrode terminal of the secondary battery 10. As illustrated in FIG. 1, when the sealed assembly 15 is formed by the vent member 16, the number of components is small, which makes it possible to reduce the cost and time needed for processing and assembling.

The sealing assembly 15 seals the opening 14a of the exterior housing body 14 with the gasket 20 interposed between the exterior housing body 14 and the sealing assembly 15. The gasket 20 is a flexible insulating member, and is compressed in the radial direction of the sealing assembly 15 while the sealing assembly 15 of the positive electrode terminal and the exterior housing body 14 of the negative electrode terminal are electrically isolated from each other, which makes it possible to achieve sealability inside the secondary battery 10. When the gasket 20 is compressed in the radial direction of the sealing assembly 15, a grooved part does not need to be provided between the gasket 20 and the electrode assembly 20, whereby the body part 14b housing the electrode assembly 12 can extend in the vertical direction to achieve higher capacity. A material of the gasket 20 is not particularly limited as long as it may serve the above-described function, and for example, polypropylene (PP), polyphenylene sulfide (PPS), polyethylene (PE), polybutylene terephthalate (PBT), perfluoroalkoxy alkane (PFA), polytetrafluoroethylene (PTFE), polyamide (PA), and the like may be used.

Next, the positive electrode tab 22 will be described with reference to FIG. 2. FIG. 2 is a perspective view of the positive electrode tab 22. The positive electrode tab 22 is a metallic thin plate, and has a non-linear portion 22a in a part in the longitudinal direction thereof. In the present embodiment, the longitudinal direction of the positive electrode tab 22 corresponds to the lead-out direction from the electrode assembly 12. The non-linear portion 22a is a portion in which two points in the longitudinal direction are not connected in the shortest distance in the positive electrode tab 22. Specifically, the non-linear portion 22a has a recess 22b and a projection 22c that face each other, at both ends along the longitudinal direction of the positive electrode tab 22 on the plan view. In the positive electrode tab 22, an area in cross section perpendicular to the longitudinal direction is preferably constant, and more preferably the positive electrode tab 22 has constant thickness and width. Unlike a notch, the area in cross section of the non-linear portion 22a is not reduced greatly. Thus, the current interrupt device can be provided in the positive electrode tab 22 while suppressing an increase in battery resistance. In the specification of the present application, the area in cross section being constant means that a value obtained by dividing the minimum area in cross area by the maximum area is equal to or more than 95%.

Next, the current interrupt device using the positive electrode tab 22 will be described with reference to FIG. 3. FIG. 3(A) is a diagram illustrating a normal state of the vicinity of the sealing assembly 15. The vent member 16 includes the inversion part 18 projecting toward the electrode assembly 12 side inside the circumferential part 17, and an inclined part 19 interposed between the inversion part 18 and the circumferential part 17. The inclined part 19 is inclined from the circumferential part 17 side toward the inversion part 18 side in a direction of the electrode assembly 12. A thickness of the inclined part 19 is preferably smaller than a thickness of the circumferential part 17, and more preferably is reduced continuously from the circumferential part 17 side toward the inversion part 18 side.

FIG. 3(B) is a diagram illustrating a state after the current interrupt device in the vicinity of the sealing assembly 15 is operated. Along with an increase in pressure in the battery, the vent member 16 is pushed toward the outer side, and the inversion part is inverted so as to project from the circumferential part 17 toward the outer side. At this time, the tensile stress acts in the longitudinal direction on the positive electrode tab 22 connecting the positive electrode and inversion part 18. Since the tensile stress concentrates in the recess 22b of the non-linear portion 22a, the positive electrode tab 22 breaks at the recess 22b, and the current path in the secondary battery 10 is interrupted. The positive electrode tab 22 can be broken by adjusting a movement amount of the inversion part 18 according to the breaking elongation of the positive electrode tab 22. The movement amount of the inversion part 18 does not necessarily need to exceed the breaking elongation of the positive electrode tab 22, and if a part of the positive electrode tab 22 can be broken in accordance with the deformation of the vent member 16, the electric resistance of the part increases locally, whereby the positive electrode tab 22 is thermally cut. The movement amount of the inversion part 18 when changing from the state in FIG. 3(A) to the state in FIG. 3(B) may be, for example, 0.5 mm to 3 mm.

The shape of the non-linear portion 22a of the positive electrode tab 22 is not particularly limited as long as the non-linear portion 22a is shaped to allow tension stress to concentrate therein, and can be, for example, a U shape or a V shape, and preferably a V shape.

Figure 4:
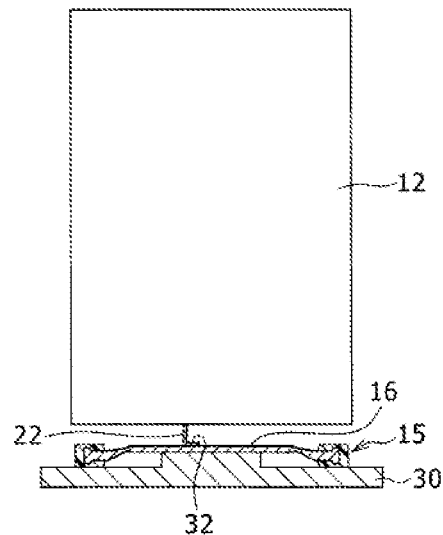
Figure 4:
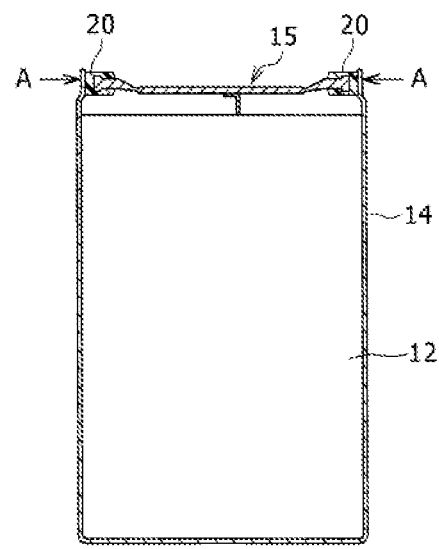

Next, a method of manufacturing the secondary battery 10 will be described with reference to FIG. 4. FIG. 4(A) is a diagram illustrating a step of connecting the positive electrode tab 22 to the sealing assembly 15. First, the electrode assembly 12 and the sealing assembly 15 are prepared. The gasket 20 is attached to the sealing assembly 15. As illustrated in FIG. 4(A), the sealing assembly 15 is placed on a fixing base 30, and is brought into contact with the positive electrode tab 22 led out from the electrode assembly 12. A welding rod is inserted into a hollow part of the electrode assembly 12, and establishes a connection between the positive electrode tab 22 and the vent member 16 forming the sealing assembly 15 by resistance welding. Thus, a connection part 32 is formed. A method of connecting the sealing assembly 15 and the positive electrode tab 22 is not particularly limited, and for example, resistance welding, ultrasonic vibration welding, laser welding or the like may be used.

FIG. 4(B) is a diagram illustrating a step of caulking the exterior housing body 14 to the sealing assembly 15. After the non-aqueous electrolyte is injected into the exterior housing body 14, the electrode assembly 12 and the sealing assembly 15 that are connected via the positive electrode tab 22 are inserted into the exterior housing body 14 as described above. At this time, insulating plates (not illustrated) are provided on the upper and lower sides of the electrode assembly 14, respectively. As illustrated in FIG. 4(B), the sealing assembly 15 is arranged inside the opening of the exterior housing body 14, and the sealing assembly 15 is caulked in the direction A (radial direction of the sealing assembly 15) from the outside of the exterior housing body 14, whereby the opening of the exterior housing body 14 is sealed by the sealing assembly 15 with the gasket 20 interposed between the exterior housing body 14 and the sealing assembly 15.

As described above, the non-aqueous electrolyte secondary battery of an aspect of the present disclosure can improve the safety while suppressing an increase in battery resistance. The present disclosure can be widely applied not only to a non-aqueous electrolyte secondary battery but also to a sealed battery.

REFERENCE SIGNS LIST

10 Secondary battery, 12 Electrode assembly, 14 Exterior housing body, 14a Opening, 14b Body part, 15 Sealing assembly, 16 Vent member, 17 Circumferential part, 18, Inversion part, 19, Inclined part, 20 Gasket, 22 Positive electrode tab, 22a Non-linear portion, 22b Recess, 22c Projection, 30 Fixing base, 32 Connection part

The invention claimed is:

1. A sealed battery, comprising:

an electrode assembly including a positive electrode having a positive electrode tab and a negative electrode;

a bottomed cylindrical metallic exterior housing body that houses the electrode assembly; and a sealing assembly that seals an opening of the exterior housing body with a gasket interposed between the exterior housing body and the sealing assembly, wherein the sealing assembly includes a metallic vent member, the vent member has a circumferential part and an inversion part projecting from the circumferential part toward the electrode assembly side, the positive electrode tab is led out from the electrode assembly to be connected to the inversion part, and has a non-linear portion in an area surrounded by the electrode assembly and the inversion part, the non-linear portion has a recess and a projection that face each other, at both ends along a lead-out direction of the positive electrode tab on a plan view, and the positive electrode tab further includes a pair of linear portions in said area, the pair of linear portions aligned to each other and extending straight in the lead-out direction, wherein the non-linear portion is interposed between the pair of linear portions in the lead-out direction, where an imaginary straight space is defined by imaginary straight lines extending in the lead-out direction to interconnect respective perimeters of the pair of linear portions, the imaginary straight lines being defined by the perimeter of the positive electrode tab in the pair of linear portions, the recess is placed inside the imaginary straight space, and the projection is placed outside the imaginary straight space.

2. The sealed battery according to claim 1, wherein in the positive electrode tab, an area in cross section perpendicular to the lead-out direction is constant.

3. The sealed battery according to claim 1, wherein the non-linear portion has a V shape.

4. The sealed battery according to claim 1, wherein an inclined part is formed between the circumferential part and the inversion part so that a thickness of the inclined part is reduced continuously from the circumferential part toward an inner peripheral side.

5. The sealed battery according to claim 1, wherein the gasket is compressed in a radial direction of the opening.

* * * * *